United States Patent
Kaluzhny et al.

(10) Patent No.: US 12,153,807 B2
(45) Date of Patent: Nov. 26, 2024

(54) MEMORY SEGMENTATION WITH SUBSTITUTION

(71) Applicant: Winbond Electronics Corporation, Taichung (TW)

(72) Inventors: Uri Kaluzhny, Beit Shemesh (IL); Nir Tasher, Herzliya (IL); Itay Admon, Pardes Hanna (IL); Mark Luko, Herzliya (IL)

(73) Assignee: WINBOND ELECTRONICS CORPORATION, Taichung (TW)

( * ) Notice: Subject to any disclaimer, the term of this patent is extended or adjusted under 35 U.S.C. 154(b) by 55 days.

(21) Appl. No.: 18/161,064

(22) Filed: Jan. 29, 2023

(65) Prior Publication Data
US 2024/0256150 A1    Aug. 1, 2024

(51) Int. Cl.
*G06F 3/06*      (2006.01)
*G06F 12/14*    (2006.01)

(52) U.S. Cl.
CPC .......... *G06F 3/0622* (2013.01); *G06F 3/0637* (2013.01); *G06F 3/0659* (2013.01); *G06F 3/0673* (2013.01); *G06F 12/1475* (2013.01)

(58) Field of Classification Search
CPC .... G06F 3/0622; G06F 3/0637; G06F 3/0659; G06F 3/0673; G06F 12/1475
See application file for complete search history.

(56) References Cited

U.S. PATENT DOCUMENTS

| | | | |
|---|---|---|---|
| 7,287,140 B1 * | 10/2007 | Asanovic | G06F 12/1483 711/208 |
| 10,817,430 B2 | 10/2020 | McGlaughlin et al. | |
| 11,301,391 B2 | 4/2022 | McGlaughlin et al. | |
| 2008/0263315 A1 | 10/2008 | Zhang et al. | |
| 2013/0290635 A1 * | 10/2013 | Craske | G06F 12/1458 711/118 |
| 2019/0361616 A1 * | 11/2019 | Jiang | G06F 12/1441 |

* cited by examiner

*Primary Examiner* — Kalpit Parikh
(74) *Attorney, Agent, or Firm* — MEITAR PATENTS LTD.

(57) ABSTRACT

An apparatus includes a memory, a Memory Section Attribute Storage (MSAS) and a memory access circuit (MAC). The memory includes a plurality of memory sections. The MSAS includes one or more entries, wherein at least some of the entries specify, for respective sections of the memory, respective section security policies, respective section base addresses and respective section sizes. The MAC is configured to receive, from a host, a memory access request that specifies an address to be accessed in the memory, to identify a target memory section that corresponds to the address, responsively to the section base addresses and to the section sizes specified in the MSAS, to receive, from the MSAS, a security policy that corresponds to the target memory section, and to apply the security policy to the memory access request.

6 Claims, 6 Drawing Sheets

MEMORY SEGMENTATION WITH SUBSTITUTION

FIELD OF THE INVENTION

The present invention relates generally to computer memory access, and more specifically, to memory segmentation schemes.

BACKGROUND OF THE INVENTION

Computer memory is typically divided into sections (sometimes called segments), having identical or different sizes; various attributes may be defined for some or all the sections.

U.S. Patent Application Publication 2008/0263315 describes a computer addressing mode and memory access method relying on a memory segment identifier and a memory segment mask for indicating memory locations. In this addressing mode, a processor receives an instruction comprising the memory segment identifier and memory segment mask. The processor employs a two-level address decoding scheme to access individual memory locations. Under this decoding scheme, the processor decodes the memory segment identifier to select a particular memory segment. Each memory segment includes a predefined number of memory locations. The processor selects memory locations within the memory segment based on mask bits set in the memory segment mask. The disclosed addressing mode is advantageous because it allows non-consecutive memory locations to be efficiently accessed.

U.S. Pat. No. 11,301,391 describes a system that includes a first memory component having a particular access size associated with performance of memory operations, a second memory component to store a logical to physical data structure whose entries map management segments to respective physical locations in the memory component, wherein each management segment corresponds to an aggregated plurality of logical access units having the particular access size, and a processing device, operably coupled to the memory component. The processing device can perform memory management operations on a per management segment basis by: for each respective management segment, tracking access requests to constituent access units corresponding to the respective management segment, and determining whether to perform a particular memory management operation on the respective management segment based on the tracking.

SUMMARY OF THE INVENTION

An embodiment of the present invention that is described herein provides an apparatus including a memory, a Memory Section Attribute Storage (MSAS) and a memory access circuit (MAC). The memory includes a plurality of memory sections. The MSAS includes one or more entries, wherein at least some of the entries specify, for respective sections of the memory, respective section security policies, respective section base addresses and respective section sizes. The MAC is configured to receive, from a host, a memory access request that specifies an address to be accessed in the memory, to identify a target memory section that corresponds to the address, responsively to the section base addresses and to the section sizes specified in the MSAS, to receive, from the MSAS, a security policy that corresponds to the target memory section, and to apply the security policy to the memory access request.

In some embodiments, sizes of the memory sections are integer powers of two, and the base addresses are integer multiples of the respective sizes of the memory sections.

In some embodiments, the MAC is configured to determine that the address belongs to the target memory section, by identifying that a section-specifying set of bits of the address, a size of the set being derived from a section size in the entry of of the target memory section, are equal to the corresponding bits of a base address in the entry of the target memory section. In an example embodiment, the section-specifying bits are the bits at bit-positions n to N−1, wherein a bit-position 0 is a least-significant bit, $2^n$ is the section size, and $2^N$ is a total size of the memory. In a disclosed embodiment, the MSAS is further configured to perform address remapping between first and second memory sections of a same size, by swapping the section-specifying bits between the entries of the first and second sections.

There is additionally provided in accordance with an embodiment that is described herein, a method including storing, for a memory including a plurality of memory sections, a Memory Section Attribute Storage (MSAS) including one or more entries, wherein at least some of the entries specify, for respective sections of the memory, respective section security policies, respective section base addresses and respective section sizes. A memory access request, which specifies an address to be accessed in the memory, is received from a host. A target memory section, which corresponds to the address, is identified responsively to the section base addresses and to the section sizes specified in the MSAS. A security policy, which corresponds to the target memory section, is received from the MSAS. The security policy is applied to the memory access request.

The present invention will be more fully understood from the following detailed description of the embodiments thereof, taken together with the drawings in which:

DETAILED DESCRIPTION OF EMBODIMENTS

Overview

Figure 1:
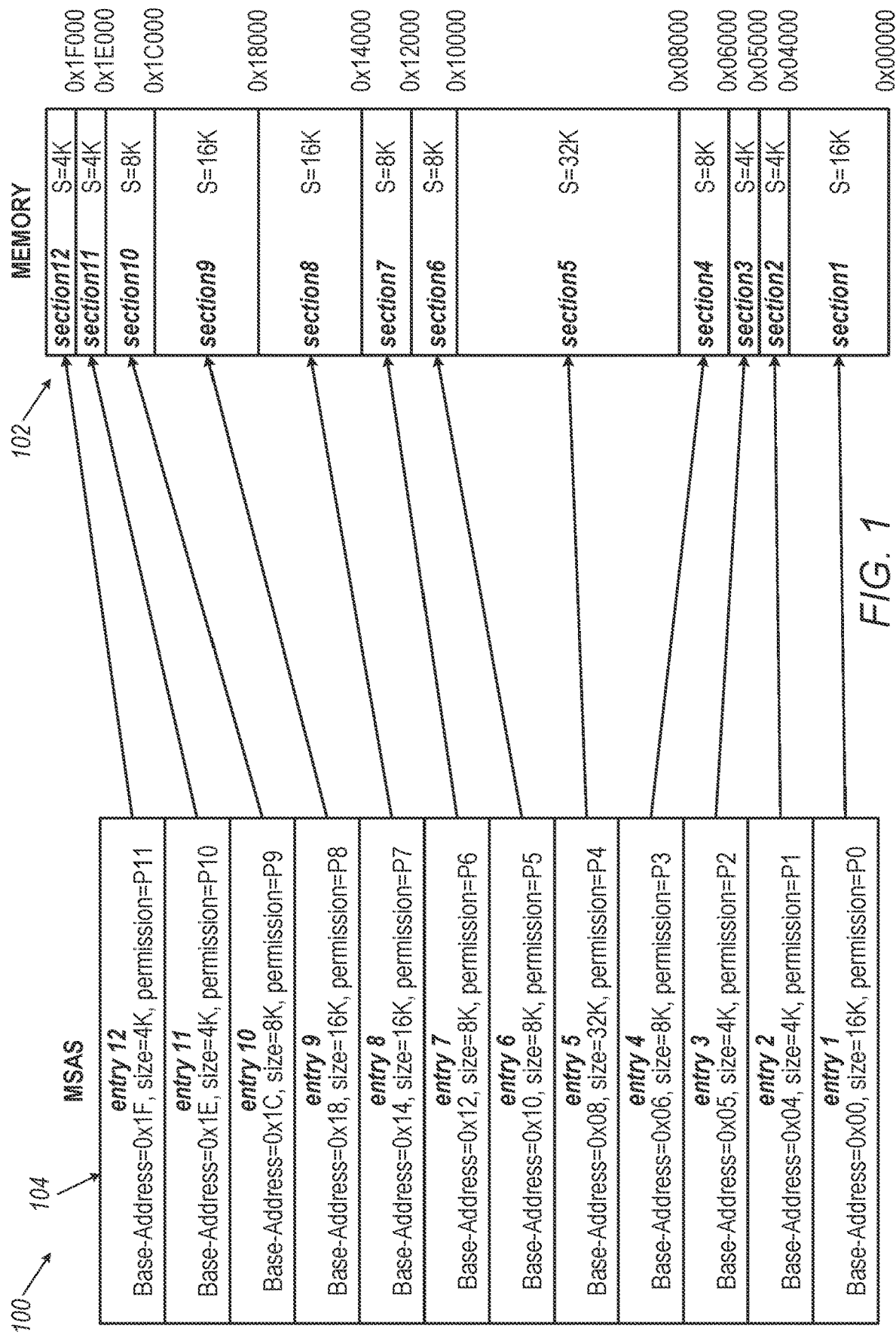
FIG. 1 is a block diagram that schematically illustrates an example configuration of a computer memory system, in accordance with an embodiment of the present invention.

The memory space of computers is often divided into memory sections or segments, which usually correspond to natural divisions of code and data such as Operating System (OS) vs. application code, system vs. user data. A permission code may be associated with memory segments; for example, for a given memory section, write access may be allowed to the operating system only, while read access may not be limited. In some computer systems, a processor may issue, with each memory access, a user ID code, and the various memory sections may define permission list for each such user.

In addition, the computer, or dedicated circuitry in the computer may sometime remap sections that the CPU accesses to different sections (typically having the same size) in memory. (This technique can be used in page-based virtual memory systems as well as on segments.)

Embodiments present invention that are disclosed herein provide efficient memory segmentation techniques, including apparatuses and methods. In an embodiment, a computer system comprises a Memory Section Attribute Storage (MSAS), which is configured to store, for every memory section, the base address of the section and the section size. In embodiments, the section size is always an integer power of two, and the section base address is an integer multiple of the respective section size; thus, in embodiments, to find out if an address is within a given section, it is sufficient to compare a reduced number of section-specifying most-significant address bits, making the disclosed scheme fast and efficient. In an embodiment, the number of address bits to be compared is equal to the base-2 log of the memory size, minus the base two log of the section size.

In some embodiments, the MSAS, responsively to a memory access request from a processor (also referred to herein as a host), concurrently compares the address to the base addresses of all segments, to locate the addressed section. In an embodiment, the MSAS further comprises security policy codes (e.g., permission codes) that are specified for each of the segments and, responsive to an address input, output the security policy code pertaining to the addressed memory section.

In some embodiments the computer system further comprises a Memory Access Control (MAC) circuit, which is configured to receive from the processor access attributes including a user-ID and a read-write indication, check the access attributes against the security policy code that the MSAS outputs, and, accordingly, either allow or deny the memory access.

In embodiments, the computer system facilitates section remapping from a user space to a physical memory space. The MSAS comprises, for each section, a remapping code; when the MSAS locates a segment according to the input address and the stored base address and section size, the MSAS remaps the address according to the respective remapping code.

System Description

In the example embodiments disclosed hereinbelow, a total memory size of 131, 072 ($2^{17}$, or 128K) bytes, with a minimum section size of 4,096 ($2^{12}$, or 4K) bytes, is assumed. The present invention, however, is not limited to 131, 072 bytes and to a minimum section size of 4,096; moreover, the datum size is not limited to a byte (e.g., the datum may be a 32-bit word). In embodiments, any suitable memory sizes, minimum section sizes and memory datum size may be used (as will be shown below, the section size should be an integer power of two).

FIG. 1 is a block diagram that schematically illustrates an example configuration of a computer memory system 100, in accordance with an embodiment of the present invention.

The computer memory system comprises a memory 102 that is divided into 12 sections. A Memory Section Attribute Storage (MSAS) 104 describes attributes, including a base address, a size, and security policy code (e.g., permission code) for each of the sections. According to the example embodiment illustrated in FIG. 1, memory size is 0x20000 (128K) and the minimum section size is 0x01000, or 4K byte; hence, the base address field of the MSAS comprises log 2 (128K)–log 2 (4K)=5 bits.

We will refer hereinbelow to security policy codes as permission codes. The disclosed techniques, however, are not limited to permission codes; in embodiments, any other suitable security policy code may be used.

The sections attribute and the respective MSAS contents are depicted in the table below:

| Section no. | size | Base address | MSAS Base field | MSAS size (5-bit) | MSAS permission |
|---|---|---|---|---|---|
| 1 | 16K | 0x00000 | 0b00000 | 0x04 | P0 |
| 2 | 4K | 0x04000 | 0b00100 | 0x01 | P1 |
| 3 | 4K | 0x05000 | 0b00101 | 0x01 | P2 |
| 4 | 8K | 0x06000 | 0b00110 | 0x02 | P3 |
| 5 | 32K | 0x08000 | 0b01000 | 0x08 | P4 |
| 6 | 8K | 0x10000 | 0b10000 | 0x02 | P5 |
| 7 | 8K | 0x12000 | 0b10010 | 0x02 | P6 |
| 8 | 16K | 0x14000 | 0b10100 | 0x04 | P7 |
| 9 | 16K | 0x18000 | 0b11000 | 0x04 | P8 |
| 10 | 8K | 0x1C000 | 0b11100 | 0x02 | P9 |
| 11 | 4K | 0x1E000 | 0b11110 | 0x01 | P10 |
| 12 | 4K | 0x1F000 | 0b11111 | 0x01 | P11 |

In embodiments, the base address of a segment is an integer product of the respective segment size. This limitation allows efficient segment search in which only a small number of section-specifying bits are compared, as will be described below (with reference to FIG. 3).

Note— to avoid ambiguity, we will refer hereinbelow to the base address bits of the address that the processor sends as Base Address, and to the MSAS bits that specify the base address bits as Base Field.

The configuration of computer memory system 100 illustrated in FIG. 1 and described above is an example that is cited for conceptual clarity. Other configurations may be used in alternative embodiments. In some embodiments, for example, since the size of the section is always a power of two, the number of bits in the section size field may be smaller (e.g., if the only possible section sizes, in multiples of 4K-byte, are 1,2, 4, 8, 16 and 32, the section size field may comprise three bits only).

Figure 2:
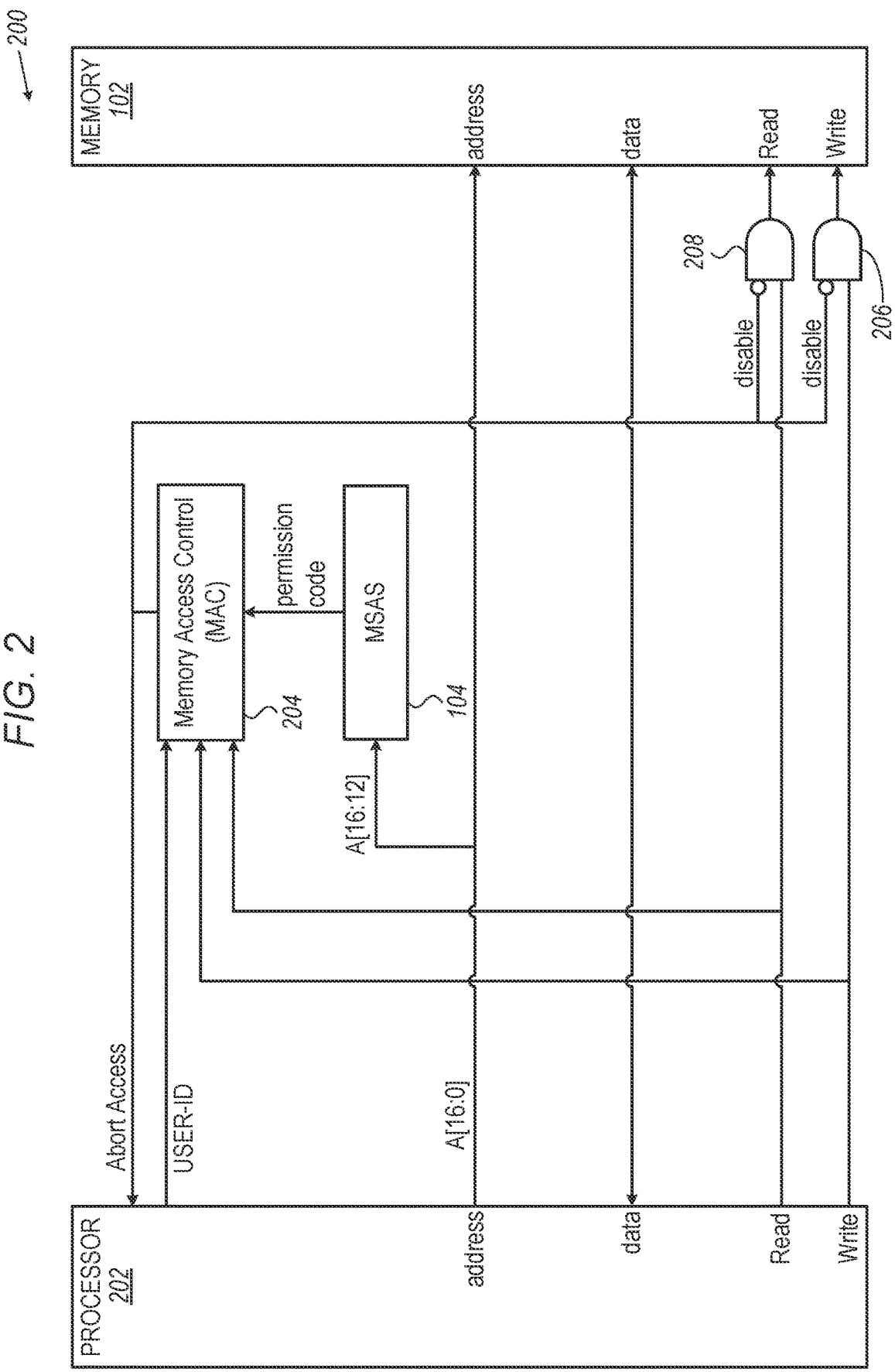
FIG. 2 is a block diagram that schematically illustrates a computer with a memory that is divided into sections, in accordance with an embodiment of the present invention.

FIG. 2 is a block diagram that schematically illustrates a computer 200 with a memory 102 that is divided into sections, in accordance with an embodiment of the present invention. A processor 202 (also referred to as a host) initiates a memory access request (e.g., memory read or memory write access) to memory 102 (FIG. 1), asserting a Read or a Write output (in other embodiments the processor may comprise a single R/W output and an access enable wire; in yet other embodiments any other suitable memory access configuration may be used).

For brevity, we will use below the term 1 g to indicate a base-2 logarithm operation. We will further refer to 1 g (mem-size)— the number of bits in the address of the full memory as N (N=17 in the example illustrated in FIG. 1), to 1 g (min-section-size)— the number of bits in the smallest section, as L, and to the number of bits in the base field of the MSAS for a section as B. In the example embodiment illustrated in FIGS. 2, N=17, L=12 and B=5.

When processor 202 accesses the memory, the processor sends an address, a Read or a Write indication, and a User-ID (e.g., user/supervisor). The B high order address bits are input to the MSAS.

In response to the input address bits, the MSAS decides which segment in the memory is accessed and sends the respective permission code to the MAC. In an embodiment, the MSAS finds an entry in which the base field is equal to the input address bits, when both the base field and the input address bits are masked according to the section size (as will be described below, with reference to FIG. 3).

Computer 200 further comprises a Memory Access Control (MAC) circuit 204, which is configured to allow or disallow access to the memory. The MAC checks the permission code that the MSAS sends, which corresponds to the section addressed by the processor, and, according to the permission code, the user-ID code and the read or write inputs, determines whether the access is to be allowed. If the access is not allowed, the MAC prevents it, e.g., by sending a Disable signal to a gate 206, to block a write operation, and/or to a gate 208, to block a read operation. Additionally, or alternatively, the MAC may send an Abort signal to the processor.

The configuration of computer 200 illustrated in FIG. 2 and described hereinabove is an example that is cited for the sake of conceptual clarity. Other configurations may be used in alternative embodiments. For example, in some embodiments, memory 102 may comprise a Non-Volatile memory (NVM) such as a Flash memory, and the access types that processor 202 sends may include read, program and erase (the permission codes will modify accordingly). In some embodiments, memory 102 may comprise a plurality of memories, with different section sizes. In embodiments, the memory can also be accessed by an external source (such as an in-circuit debugger), and the user-ID types may include one or more External user ID types.

Matching an Address to a Section

In embodiments, the section size is an integer power of two, and the base address of sections is limited to a multiplication of the respective section size by an integer; this limitation simplifies the finding of the target segment of a given access address.

In the example configuration illustrated in FIG. 1, to find out if an N-bit address A that the processor sends accesses a segment k with B-bit base address field $BA_k$ and segment size $S_k$, only the high order bits of A and of $BA_k$, which are referred to as section specifying bits, should be compared, where $t=B-(1\ g\ (S_k)-L)$. For example, if the base address field is 0x08 (entry 5 of MSAS 104, FIG. 1) and the segment size is 32K, $t=5-(15-12)=2$; to find out if an address falls in section 5, one needs to compare only the two high order bits of the section.

Figure 3:
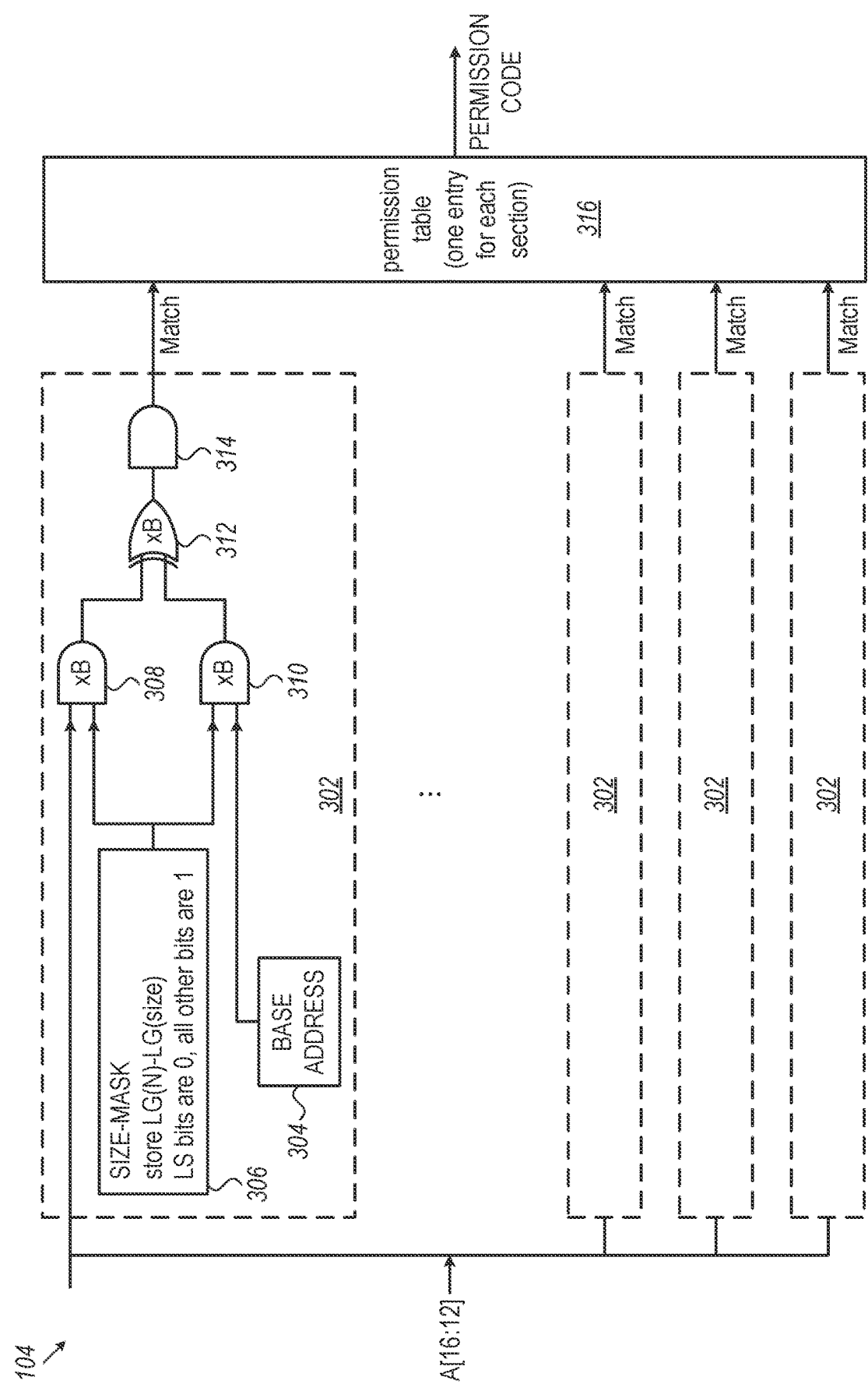
FIG. 3 is a block diagram that schematically illustrates a Memory Section Attribute Storage (MSAS), in accordance with an embodiment of the present invention.

FIG. 3 is a block diagram that schematically illustrates an MSAS 104, in accordance with an embodiment of the present invention. The MSAS comprises a plurality of section entries 302. Each section entry comprises a base-address store 304 that stores the base fields for the respective section, and a size-mask store 306 that stores a bit comparison mask for the section. The bit comparison mask comprises (1 g ($S_k$)-L) least-significant bits that are set to logic-zero, and the remaining (high-order) bits set to logic-1. (It should be noted that, since the size is always an integer power of two, the number of different sizes equals to B (e.g., 4K, 8K, 16K, 32K, 64K and 128K); in some embodiments, the size-store comprises an encoding of the segment size and requires 1 g (B) bits. For example, 4K may be encoded as 0b000, 8K as 0b001, 16K as 010, 32K as 011, 32K as 100, 64K as 101 and 128K as 110. This arrangement saves storage bits, but requires a decoding logic, to generate the bit mask.)

AND gates 308 (total of B gates) logic—And each of the B high order bits of the address that the processor sends with a corresponding bit of the bit-mask, whereas AND gates 310 (B gates) logic—And the base field bits with the corresponding bits of the bit mask (in some embodiments, base field store 304 comprises B bits, with the (1 g ($S_k$)-L) least significant bits set to logic-0 and, hence, gate 310 may not be needed).

The B-bit outputs of gates 308 and gates 310 are input to B Exclusive—Or (XOR) gates 312; each XOR gate comparing a pair of an address bit and corresponding base field bit. An And gate 314 then generates a single Match indication if all the unmasked A[16:12] address bits are equal to the unmasked base field bits.

According to the example embodiment illustrated in FIG. 3, a permission table 316 stores the permissions of the sections (P0 to P19 in MSAS 104 table, FIG. 1). When one of entries 302 indicates a match, the permission table sends the respective permission code to MAC 204 (FIG. 2), which will apply the permission to the current access.

The configuration of MSAS 104 illustrated in FIG. 3 and described hereinabove is an example that is cited by way of example. Other configurations may be used in alternative embodiments. For example, in some embodiments, MSAS 104 comprises a content-addressable memory (CAM) that is configured to carry out the masked comparison described above. In other embodiments the permission codes are stored in the corresponding entries 302. In yet other embodiments, each entry may store other bits, including, for example, remapping information (to be described below, with reference to FIG. 4) and/or a wear measure (for use in NVM memories).

Segment Remapping

Computer system sometime facilitate memory remapping, for example, to support virtual memory, or to allow code reuse. Embodiments according to the present invention support segment-base memory remapping, in which the user (typically an operating system) defines remapping of segments that the processor sends to different segments in the memory (the user memory is often referred to as logical memory, whereas the actual memory is referred to as physical memory). The segments are typically of the same size; however, in some embodiments, a section that the processor accesses may be remapped to the lower part of a bigger section (e.g., to allow access to only a part of the section, for security reasons).

Figure 4:
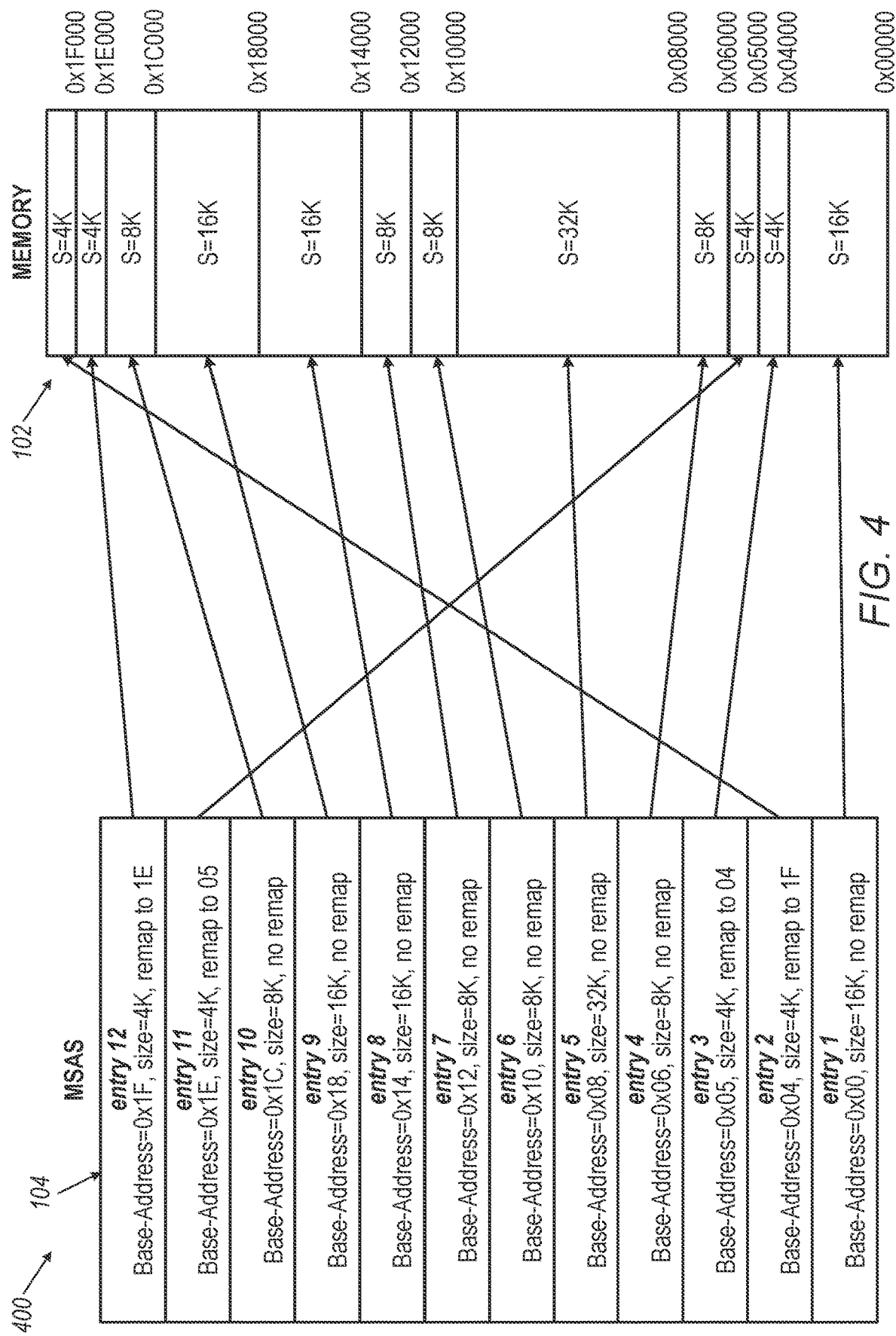
FIG. 4 is a block diagram that schematically illustrates an example section-remapping of a computer memory, in accordance with an embodiment of the present invention.

FIG. 4 is a block diagram that schematically illustrates an example section-remapping 400 of a computer memory, in accordance with an embodiment of the present invention. MSAS 104 includes, for each entry, a remap field, which indicates sections in memory 102 into which accesses of processor 202 are directed.

In the example configuration illustrated in FIG. 4, the MSAS remaps processor-accessed segments in the logical memory into equal-size segments in the physical memory. For example, the 4K section in entry 2, with base field=0x04, is remapped to a same size section with base field=0x1F. Some sections (e.g., the section in entry 5) are not remapped. In some embodiments, for ease of implementation, sections that are not remapped will be remapped to the same base address.

Figure 5:
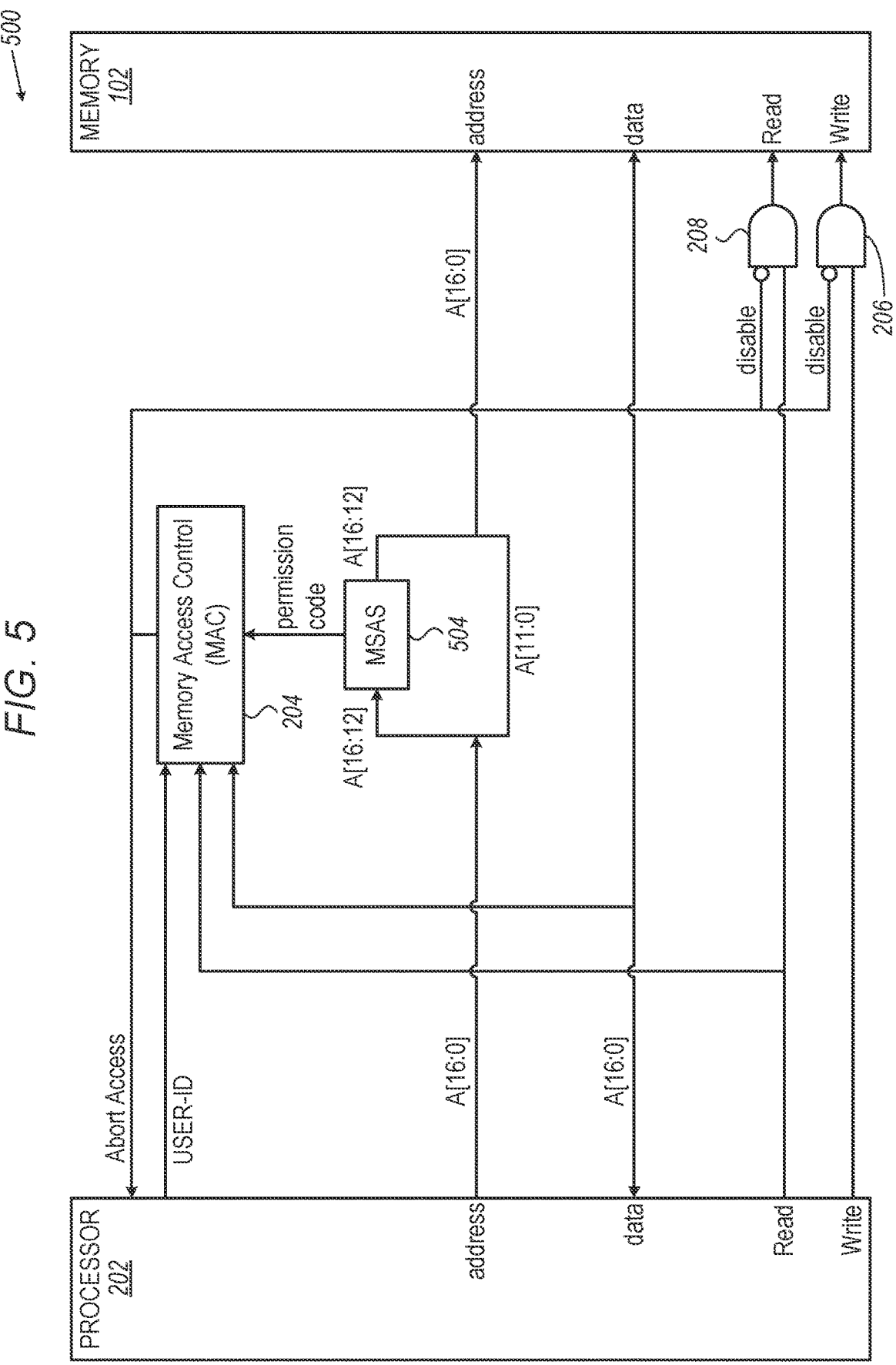
FIG. 5 is a block diagram that schematically illustrates a computer with section remapping, in accordance with an embodiment of the present invention.

FIG. 5 is a block diagram that schematically illustrates a computer 500 with section remapping, in accordance with an embodiment of the present invention. Like computer 200 illustrated in FIG. 2, computer 500 comprises a processor 202, a memory 102 and a MAC 204. However, computer 500 comprises an MSAS 504, which is configured to remap sections that the processor 202 accesses to sections in memory 102, according to remapping entries that MSAS 504 includes.

Like MSAS 104 (FIG. 2), MSAS 504 is configured to receive the B high order address bits, locate a segment in the memory that is to be accessed and send the respective permission code to the MAC. Unlike MSAS 104, MSAS 504 is further configured to remap the B high order bits to a base address in the memory which may be different from the B input bits; thus, the MSAS can remap sections that processor 202 accesses. (The other units of computer 500, including MAC 204, gate 206 and gate 208, are identical to respective units of computer 200 that have the same unit numbers.)

Figure 6:
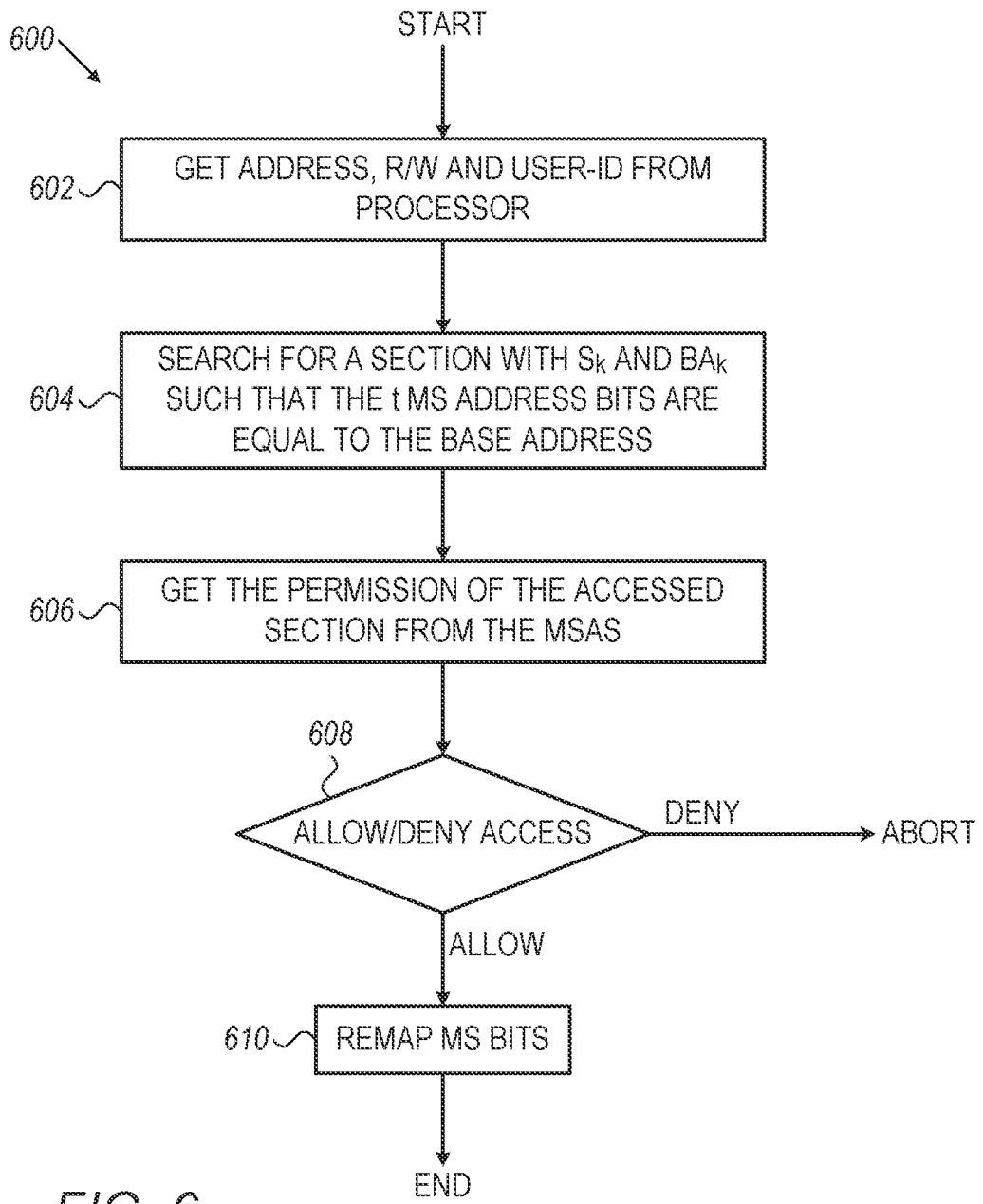
FIG. 6 is a flowchart that schematically illustrates a method for memory segmentation, in accordance with an embodiment of the present invention.

FIG. 6 is a flowchart 600 that schematically illustrates a method for memory segmentation, in accordance with an embodiment of the present invention. The flowchart is executed by MSAS 504 and MAC 204 (FIG. 5).

The flowchart starts at a get-memory-access operation 602, wherein, further to a memory access request that processor 202 initiates, the MSAS receives the high order address bits, and the MAC receives a user ID code (e.g., user/supervisor) and a read-write indication (e.g., a Read input and a Write input).

Next, in a search-section operation 604, the MSAS searches for a section k with segment size $S_k*2^L$ and base field $BA_k$, so that the t most significant bits of the address bits are equal to $BA_k$, where $t=B-(1\ g\ (S_k)-L)$.

The flowchart now enters a get-permission operation 606, wherein the MSAS outputs a permission code $P_k$ that corresponds to segment k, to the MAC. Next, in an allow/deny access operation 608, the MAC checks the user-ID indication and the read/write indications that the processor sends against the permission code that the MSAS sends. If the access is not allowed, the MAC will send and Abort signal to the processor and/or inhibit the memory access (e.g., by sending a disable indication to gates 206, 208).

If, in operation 608, the MAC allows the access, the flowchart may enter a remap operation 610 and remap the access by modifying the t MS bits.

After operation 610 the flowchart ends.

The configuration of flowchart 600 illustrated in FIG. 6 and described hereinabove is an example configuration. Other flowcharts may be used in alternative embodiments. For example, in an embodiment, the MSAS does not send an abort indication (but does block the memory access). In another example, remapping is not implemented, and the flowchart ends after operation 608.

The configurations of computer system 200, including MAC 204, MSAS 104, section entries 302, and the method of flowcharts 600, illustrated in FIGS. 1 through 6 and described hereinabove, are example configurations and flowchart that are shown purely for the sake of conceptual clarity. Any other suitable configurations and flowcharts can be used in alternative embodiments.

The different sub-units of computer system 200, including MAC 204, MSAS 204 and subunits thereof, may be implemented using suitable hardware, such as in one or more Application-Specific Integrated Circuits (ASICs) or Field-Programmable Gate Arrays (FPGAs), using software, using hardware, or using a combination of hardware and software elements.

processor 202 may comprise one or more general-purpose processors, which are programmed in software to carry out the functions described herein. The software may be downloaded to the processor in electronic form, over a network or from a host, for example, or it may, alternatively or additionally, be provided and/or stored on non-transitory tangible media, such as magnetic, optical, or electronic memory.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus, comprising:
   a memory comprising a plurality of memory sections;
   a Memory Section Attribute Storage (MSAS) comprising one or more entries, wherein at least some of the entries specify, for respective sections of the memory, respective section security policies, respective section base addresses and respective section sizes; and
   a memory access circuit (MAC), configured to:
      receive, from a host, a memory access request that specifies an address to be accessed in the memory;
      identify a target memory section that corresponds to the address, responsively to the section base addresses and to the section sizes specified in the MSAS;
      receive, from the MSAS, a security policy that corresponds to the target memory section; and
      apply the security policy to the memory access request,
      wherein the MAC is configured to determine that the address belongs to the target memory section, by identifying that a section-specifying set of bits of the address, a size of the set being derived from a section size in the entry of the of the target memory section, are equal to the corresponding bits of a base address in the entry of the target memory section, and
      wherein the MSAS is further configured to perform address remapping between first and second memory sections of a same size, by swapping the section-specifying bits between the entries of the first and second sections.

2. The apparatus according to claim 1, wherein sizes of the memory sections are integer powers of two, and wherein the base addresses are integer multiples of the respective sizes of the memory sections.

3. The apparatus according to claim 1, wherein the section-specifying bits are the bits at bit-positions n to N−1, wherein a bit-position 0 is a least-significant bit, 2n is the section size, and 2N is a total size of the memory.

4. A method, comprising:
   storing, for a memory comprising a plurality of memory sections, a Memory Section Attribute Storage (MSAS)

comprising one or more entries, wherein at least some of the entries specify, for respective sections of the memory, respective section security policies, respective section base addresses and respective section sizes;

receiving, from a host, a memory access request that specifies an address to be accessed in the memory;

identifying a target memory section that corresponds to the address, responsively to the section base addresses and to the section sizes specified in the MSAS;

receiving, from the MSAS, a security policy that corresponds to the target memory section; and applying the security policy to the memory access request, wherein identifying the target memory section comprises determining that the address belongs to the target memory section, by identifying that a section-specifying set of bits of the address, a size of the set being derived from a section size in the entry of the of the target memory section, are equal to the corresponding bits of a base address in the entry of the target memory section, and further comprising performing address remapping between first and second memory sections of a same size, by swapping the section-specifying bits between the entries of the first and second sections.

5. The method according to claim 4, wherein sizes of the memory sections are integer powers of two, and wherein the base addresses are integer multiples of the respective sizes of the memory sections.

6. The method according to claim 4, wherein the section-specifying bits are the bits at bit-positions n to N−1, wherein a bit-position 0 is a least-significant bit, 2n is the section size, and 2N is a total size of the memory.

* * * * *